W. F. KENNEY.
NUT LOCK.
APPLICATION FILED MAR. 13, 1908.

932,395.

Patented Aug. 24, 1909.

WITNESSES
Colin M. Holmes.
Howard A. Lamprey

INVENTOR
William F. Kenney
per S. Scholfield
ATTORNEY

UNITED STATES PATENT OFFICE.

WILLIAM F. KENNEY, OF PROVIDENCE, RHODE ISLAND.

NUT-LOCK.

932,395. Specification of Letters Patent. Patented Aug. 24, 1909.

Application filed March 13, 1908. Serial No. 420,994.

*To all whom it may concern:*

Be it known that I, WILLIAM F. KENNEY, a citizen of the United States, residing at Providence, in the State of Rhode Island, have invented a new and useful Improvement in Nut-Locks, of which the following is a specification.

The nature of my invention consists in the improved construction of the nut lock, and in the employment of screw threads of unequal pitch to bind the reversely threaded locking screw, thus preventing the accidental removal of the said screw from its set position as hereinafter set forth.

Figure 1:
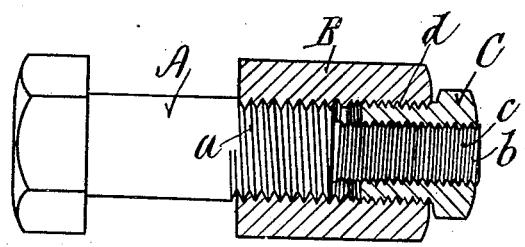
Figure 2:
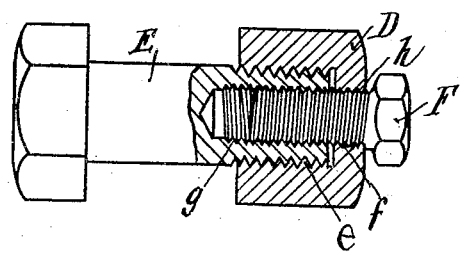
Figure 3:
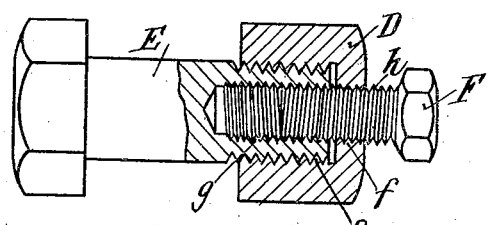

In the accompanying drawings:—Figure 1 represents a sectional longitudinal view of one form of nut-lock to which my invention may be applied. Fig. 2 represents a sectional longitudinal view of another form of construction. Fig. 3 represents the same view as in Fig. 2, with the locking screw in an outward position.

In the drawing, Fig. 1 A represents a bolt provided with the right hand screw thread $a$, and having an integral projection $b$, having a left hand thread $c$, preferably of less pitch than that of the thread $a$. The nut B is provided at one end of its bore with a screw thread fitting the thread $a$ of the bolt, and at the other end with a finer left hand thread $d$, which corresponds in direction with the pitch of the thread $c$, and when the bolt A is in use a hollow locking screw C is employed, having an outer thread which engages with the left hand thread $d$ of the nut, and an inner thread which engages with the left hand thread $c$ of the projection $b$ of the bolt; and either one or the other of these engaging threads may be made of slightly different pitch, as for instance one more, or one less threads to an inch in order to cause a cramping action of the threads as the screw C is being screwed forward into the bore of the nut B and also screwed upon the projection $b$ of the bolt, the screw C being brought forward until the resistance encountered becomes so great that the screw C cannot work loose after the nut B has been screwed up and locked in its tightened position.

Another form of nut lock to which my invention may be applied is shown in Figs. 2 and 3, in which the nut D is provided with the right and left hand threads $e$ and $f$, and the bolt E bored out and provided with the left hand thread $g$, the said threads $f$ and $g$ being engaged by the corresponding left hand thread $h$ of the screw F, which is made of slightly different pitch from the thread $g$ of the bore of the bolt, whereby upon screwing up the nut D, and the screw F, the cramping of the threads will serve to lock the nut D in its set position.

The special construction of the nut-lock may be varied without departing from the spirit of my invention which consists mainly in the employment of screw threads of slightly different pitch, to prevent the loosening of the locking screw which serves to retain the nut in its set position.

I claim as my invention:—

In a nut-lock, the combination of a bolt provided with opposite right and left hand threads, with a nut also provided with opposite right and left hand threads, and a locking screw provided with an engaging thread having a slightly different pitch from that of the screw thread with which it engages, whereby the cramping of the said threads of unequal pitch will serve to bind the locking screw of the nut and prevent its accidental removal from the set position.

WILLIAM F. KENNEY.

Witnesses:
SOCRATES SCHOLFIELD,
BENJAMIN L. DENNIS.